124,855

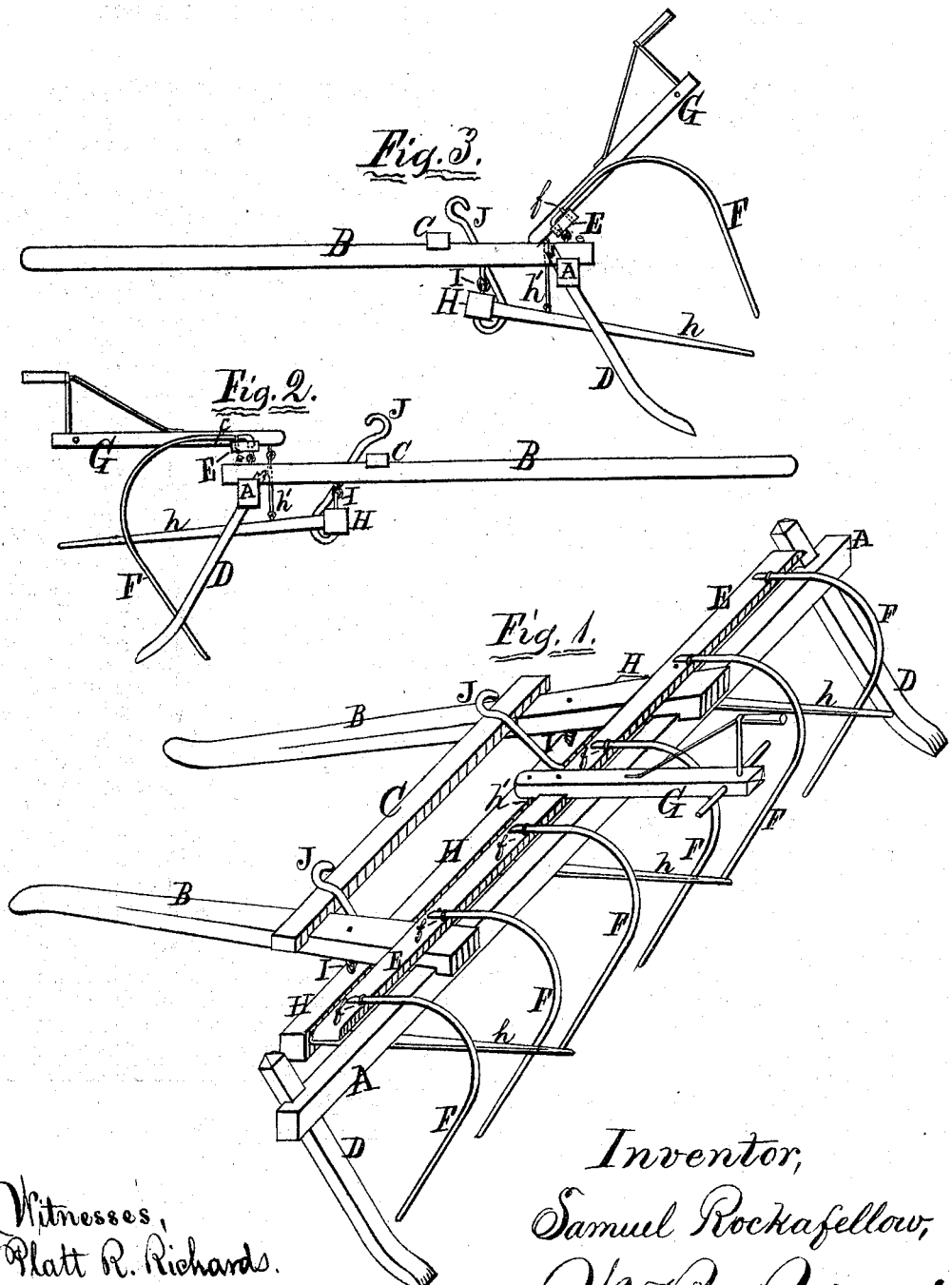

UNITED STATES PATENT OFFICE.

SAMUEL ROCKAFELLOW, OF MOLINE, ILLINOIS.

IMPROVEMENT IN HORSE HAY-RAKES.

Specification forming part of Letters Patent No. 124,855, dated March 19, 1872.

SPECIFICATION.

I, SAMUEL ROCKAFELLOW, of Moline, in the county of Rock Island and State of Illinois, have invented certain Improvements in Horse-Rakes, of which the following is a specification:

*Nature and Objects of the Invention.*

The nature of my invention relates to improvements in that class of horse hay-rakes known as lift-rakes; and the invention consists in attaching the teeth to a head, which is pivoted above the main frame, and in such a manner that the teeth may be elevated by the handle without lifting the main frame or runners from the ground, the clearer-teeth being so arranged therewith that lifting the handle to raise the rake will at the same time bring down the clearer to clear the teeth.

*Description of the Accompanying Drawing.*

Figure 1 is a perspective view, with the clearers up in the position for collecting the hay. Fig. 2 is a side elevation of Fig. 1. Fig. 3 is a side elevation, with the clearers down in position for discharging the hay from the rake.

*General Description.*

A is the main bar, to which the other parts of the rake are attached. B B are the thills, with a cross-stay, C. D D are the runners, for supporting the bar A. E is the rake head, pivoted above and to the bar A by the eye-bolts $e$. Letters F represent the rake-teeth, which are of wire, curved as shown. The teeth F are attached to the rake-head E by having their upper ends bent down at a right angle, and inserted in the upper side of the rake-head, as shown, in which position they are held by a staple, $f$, passing through the rake-head, and clinched on the under side. G is the handle, its forward end secured to the rake-head E. By raising its rear end the operator may rotate the head E and raise the teeth F from the ground without lifting the other parts of the frame. The handle G is composed of two parts, which form upper and lower handles, as shown, so that the operator need not stoop to press on the handle when the rake is full of hay and requires holding down, but may hold by the upper handle, and, when the rake is elevated, by the lower handle. H is the clearer-head, and $h\ h\ h$ are the teeth of the same. The clearer-head H is pivoted to the under side of the thills B B by eye-bolts I I. $h'$ is a link connecting the forward end of the handle G with one of the clearer-teeth $h$. J J are the draft-hooks, projecting from the clearer-head H upward and curving forward over the cross-bar C.

The operation of my invention is as follows: Figs. 1 and 2 show the rake in position, with the clearer-teeth elevated, for collecting the hay forward of the teeth F as the rake is drawn forward. To discharge the hay and leave it in windrows or otherwise, the operator raises the rear end of the handle G, which operation rotates the head E and raises the teeth F to the position shown at Fig. 3, at the same time throwing down the clearer-teeth $h\ h\ h$, and sweeping the hay from the rake. As soon as the hay is discharged and the rake has passed over the same, the operator drops the handle, and the draft on the hooks J J brings them forward, and all parts again into working position, as shown at Figs 1 and 2.

*Claim.*

The combination of clearer H $h$, link $h'$, hinged rake E F, hooks J, handle G, and frame A, constructed and operating in the manner and for the purpose substantially as set forth.

SAMUEL ROCKAFELLOW.

Witnesses:
B. R. RICHARDS,
D. H. CLARKE.